(12) United States Patent
Lee

(10) Patent No.: US 8,912,910 B2
(45) Date of Patent: Dec. 16, 2014

(54) SYSTEM AND METHOD FOR CONTROLLING AND MANAGING MEDICAL SUPPLIES STORED INSIDE MEDICAL REFRIGERATOR OR FREEZER

(75) Inventor: Hui Ling Charlotte Lee, Hong Kong (HK)

(73) Assignee: First Leadway Limited, Hong Kong (HK)

( * ) Notice: Subject to any disclaimer, the term of this patent is extended or adjusted under 35 U.S.C. 154(b) by 178 days.

(21) Appl. No.: 13/584,841

(22) Filed: Aug. 14, 2012

(65) Prior Publication Data

US 2013/0049967 A1 Feb. 28, 2013

(30) Foreign Application Priority Data

Aug. 22, 2011 (HK) .................................... 11108849

(51) Int. Cl.
*G08B 17/00* (2006.01)

(52) U.S. Cl.
USPC ..................... 340/585; 340/10.42; 340/572.7; 235/385; 705/28

(58) Field of Classification Search
USPC ................. 340/572.1, 572.4, 10.1, 10.3, 585, 340/572.7, 10.42; 235/381, 382, 383, 385, 235/380; 705/22, 28, 29, 30
See application file for complete search history.

(56) References Cited

U.S. PATENT DOCUMENTS

| | | | |
|---|---|---|---|
| 6,294,997 B1* | 9/2001 | Paratore et al. | 340/572.1 |
| 6,677,857 B2* | 1/2004 | Bara et al. | 340/572.1 |
| 6,982,640 B2* | 1/2006 | Lindsay et al. | 340/540 |
| 7,775,056 B2* | 8/2010 | Lowenstein | 62/127 |
| 2002/0183882 A1 | 12/2002 | Dearing et al. | |
| 2007/0272746 A1* | 11/2007 | Ortiz et al. | 235/385 |
| 2009/0027202 A1* | 1/2009 | Copeland et al. | 340/572.1 |
| 2010/0259364 A1* | 10/2010 | Man | 340/10.1 |

FOREIGN PATENT DOCUMENTS

WO 2007/084866 7/2007

OTHER PUBLICATIONS

Extended European Patent Search Report issued for application No. 12180952.9 by the European Patent Office.

* cited by examiner

*Primary Examiner* — Hung T. Nguyen

(57) ABSTRACT

The present invention is directed to a system and method for controlling and managing medical supplies stored inside medical refrigerator or freezer. The system includes a reader and at least two antenna situated in different locations of the exterior of the refrigerator or freezer and are connected to the reader individually; electronic labels attached on the medical supplies which store identification codes of corresponding medical supplies; processing unit which is connected to the reader for receiving identification codes of medical supplies from reader through the antenna, and determines a general position of the corresponding medical supply in the storage space according to the situated location and beam coverage area of the antenna, thus allowing one to quickly retrieve said medical supply.

20 Claims, 5 Drawing Sheets

SYSTEM AND METHOD FOR CONTROLLING AND MANAGING MEDICAL SUPPLIES STORED INSIDE MEDICAL REFRIGERATOR OR FREEZER

CROSS-REFERENCE TO RELATED APPLICATIONS

This application claims priority of Hong Kong Application No. 11108849.3 filed on Aug. 22, 2011, the entire content of which is hereby incorporated by reference.

FIELD OF THE PATENT APPLICATION

The present application is directed to the technology of radio frequency identification (RFID). More specifically, it is directed to a system and method for controlling and managing medical supplies stored inside medical refrigerator or freezer.

BACKGROUND

In the medical system, some medical supplies, such as medications, reagents or vaccines, are required to be stored inside medical refrigerator or freezer. However, the current management of medical supplies inside the medical refrigerator or freezer only directs against the demand on temperature provided inside the medical refrigerator or freezer. Such management method is obviously too simple, for example, when a finder needs to obtain a certain medical supply, a large amount of time is required before he can readily find the location of medical supply. Such will cause large amount of cold air to be loss due to doors of the medical refrigerator or freezer being opened for too long and result in rise in temperature, which will affect the quality and therapeutic effect of other medical supplies.

SUMMARY

According to one aspect of the present application, there is provided a system for controlling and managing medical supplies stored inside medical refrigerator or freezer including a reader, at least two antennas situated in different locations at the exterior of the medical refrigerator or freezer, transponders or tags attached on the medical supplies and a processing unit that is connected to the reader. The medical supplies are stored inside the storage space in the medical refrigerator or freezer. The transponder or tag stores the identification code of the corresponding medical supplies. The processing unit receives the identification code of the medical supply read from the reader through the antennas and determines the specific location of the medical supplies in the storage space according to the situated location of the antennas and their scope of beam coverage, so that one can quickly retrieve the medical supplies.

DETAILED DESCRIPTION

Figure 1:
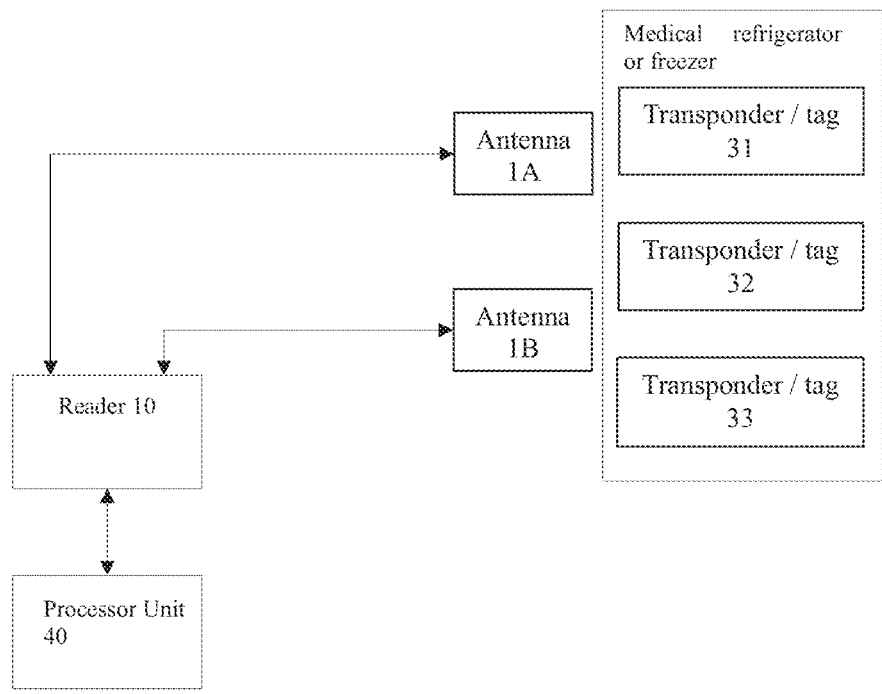
FIG. 1 is a logical structure drawing of a system for controlling and managing medical supplies stored in a medical refrigerator or freezer of an embodiment of the present application.

FIG. 1 illustrates a logical structure drawing of a system for controlling and managing medical supplies stored in a medical refrigerator or freezer of an embodiment of the present application. The system includes: a reader 10, two antennas 1A, 1B, transponders or tags 31, 32, 33 attached on the medical supplies and a processing unit 40, the processing unit 40 can be for example a remote computer or server. Even though FIG. 1 only illustrates two antennas 1A, 1B, three transponders or tags 31, 32, 33, the present application does not impose limits on their amount. According to the actual needs, antennas can exist freely in two or more in number. Since one transponder or tag is attached to one medical supply, the number of transponders or tags is selected according to the number of medical supplies. In the present embodiment, the medical supplies, such as medications, reagents, vaccines, etc., are stored in the storage space of the medical refrigerator or freezer. The transponder or tag attached on the medical supply stores the identification code of that medical supply. The identification code is a representing code that corresponds solely to that medical supply. Antennas 1A, 1B are located in different locations of the exterior of the medical refrigerator or freezer, and the transponders or tags 31, 32, 33 on the medical supplies are within the scope of the beam coverage of the antenna 1A and/or 1B. Reader 10 is connected to the two antennas 1A, 1B, the processing unit 40 and the reader 10 are connected. When the system is at work, the reader 10 reads the transponders or tags 31, 32, 33 through the antennas 1A, 1B, and sends the read identification code of the corresponding medical supply to the processing unit 40. The processing unit 40 determines the specific location of each medical supply in the storage space according to the situated location of the antennas 1A, 1B and its beam coverage scope, so that one can easily retrieve the medical supply. This can reduce the time spent to retrieve the medical supply and avoid the doors of the medical refrigerator or freezer from opening too long to cause large amount of cold air to be loss, which will result in rise in temperature, and affect the quality and therapeutic effect of medical supplies stored in the medical refrigerator or freezer.

Figure 2:
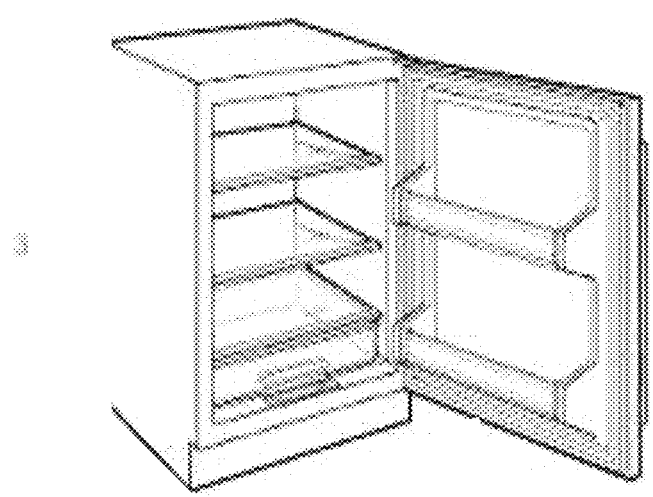
FIG. 2 is a structure drawing of the medical refrigerator or freezer.
Figure 3:
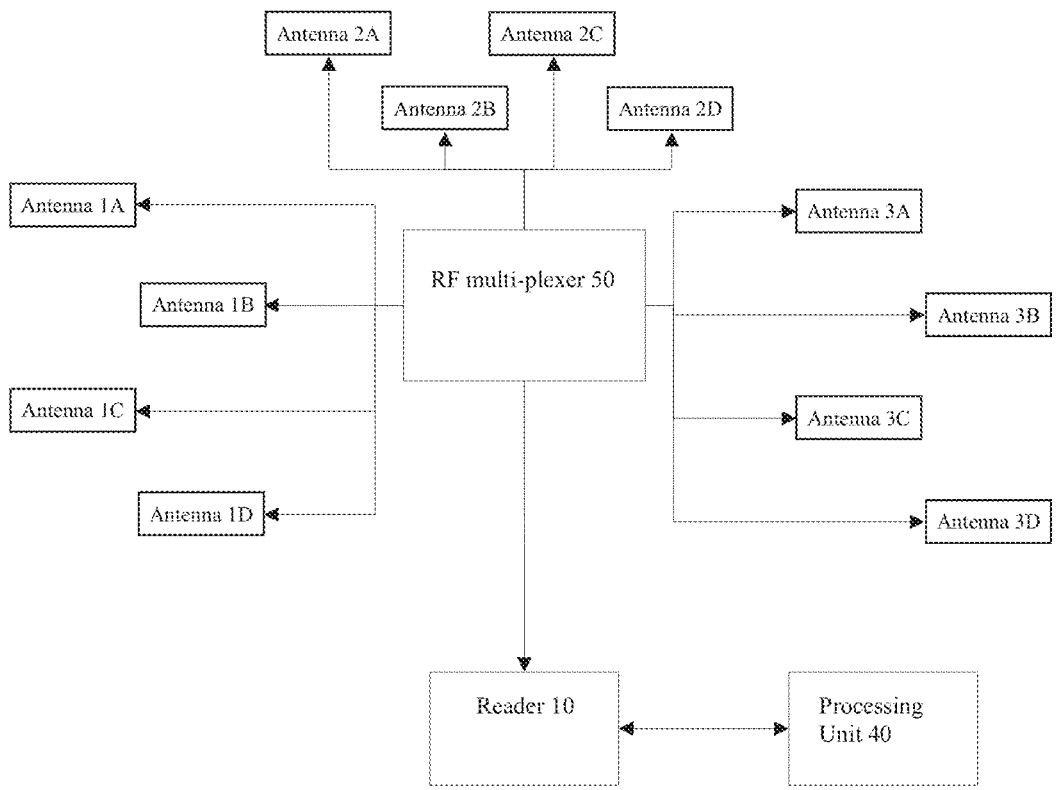
FIG. 3 is a logical structure drawing of a system for controlling and managing medical supplies stored in a medical refrigerator or freezer of another embodiment of the present application.

FIG. 3 illustrates the logical structure drawing of a system for controlling and managing medical supplies stored in a medical refrigerator or freezer of another embodiment of the present application. In this embodiment, the system includes: a reader 10, twelve antennas 1A, 1B, 1C, 1D, 2A, 2B, 2C, 2D, 3A, 3B, 3C, 3D, RF multi-plexer 50 and a processing unit 40, a further explanation should be made in that FIG. 3 has not illustrated the transponder or tag being attached on the medical supplies, but should be understandable that it also possesses the transponder or tag as shown in the previous embodiment. In combination with FIG. 2, the medical refrigerator is compartmentalized into three layers, the exterior of each layer is situated with four antennas, such as, the exterior of the first level is situated with antennas 1A, 1B, 1C, 1D. The exterior of the second level is situated with antennas 2A, 2B, 2C, 2D. The exterior of the third level is situated with antennas 3A, 3B, 3C, 3D. Obviously, in other embodiments, medical refrigerator or freezer can also include layers in different numbers. In the embodiment in FIG. 3, one end of the RF multi-plexer 50 connects to the reader 10, while the other end, according to assigned task, selects and connects to the antennas situated at the corresponding layers of the medical refrigerator or freezer. The processing unit 40 connects to the reader 10, and the processing unit 40 receives the identification code of the medical supplies through the antennas of the corresponding layers read from the reader 10, and determines the specific location of the medical supplies at the storage space according to the corresponding situated location of the antennas at the corresponding layers and its scope of beam coverage, so as to allow one to quickly retrieve the medical supplies. For example, if the location of a certain medical supply in the first layer is needed to be found, the RF multi-plexer 50 will be connected to the antennas of a first layer 1A, 1B, 1C, 1D and will read the transponder or tag of the medical supplies within the scope of its beam coverage according to the scanning in ordered sequence by the antennas 1A, 1B, 1C, 1D, and sends the read identification code of the medical supply to the processing unit 40. For example, certain medical supplies are merely read by antenna 1A, certain medical supplies are merely read by antenna 1B, certain medical supplies are merely read by antenna 1C, certain medical supplies are merely read by antenna 1D, certain medical supplies are simultaneously read by antennas 1A and 1B, certain medical supplies are simultaneously read by antennas 1B and 1C, certain medical supplies are simultaneously read by antennas 1B, 1C and 1D, and so forth. After the processing unit 40 has received the read identification code through different antennas within different beam coverage scope, the processing unit 40 can then determine the specific location of the medical supplies according to the different situated location of the antennas and its beam coverage scope. Similarly, the detecting of locations of other medical supplies is the same, and so will not be reiterated. In one embodiment, temperature sensors are situated inside the transponders or tags on medical supplies, for detecting the temperature of the surrounding environments of the medical supplies. After the reader 10 reads the transponders or tags of the medical supplies, it has also read the corresponding temperature as detected. Afterwards, the processing unit 40 also receives the temperature as detected by the temperature sensor, and determines whether the frozen or cold environmental temperature has exceeded the pre-set scope of temperature according to the detected temperature, and issues warning signals when the temperature has exceeded the scope of the pre-set limit. The warning signals include mobile phone warning signals, internet warning signals, sound or text messages.

In one embodiment, transponders or tags also stores the remaining amount of the corresponding medical supplies. After the reader 10 reads the transponders or tags on the medical supplies, it has also read the remaining amount of such medical supplies. The processing unit 40 also receives the remaining amount of the medical supplies and determines whether such medical supplies have been fully utilized according to the remaining amount of medical supplies as received so as to perform cost management.

In one embodiment, the transponder or tag also stores the expiration date of the corresponding medical supplies. After the reader 10 reads the transponders or tags on the medical supplies, it has also read the expiration date of such medical supplies. The processing unit 40 also receives the expiration date of the medical supplies and determines whether the expiration date has arrived according to the expiration date as received, and display reminder signals upon arrival of the expiration date.

In one embodiment, the processing unit 40 also records the cut-off time of electricity in the medical refrigerator or freezer, and issues notice on the temperature gathered during the electricity cut-off period and revive time when the electricity has been revived. Methods of issuing notice can include, for example, sound, voice, messages or wired/wireless internet modes.

Figure 4:
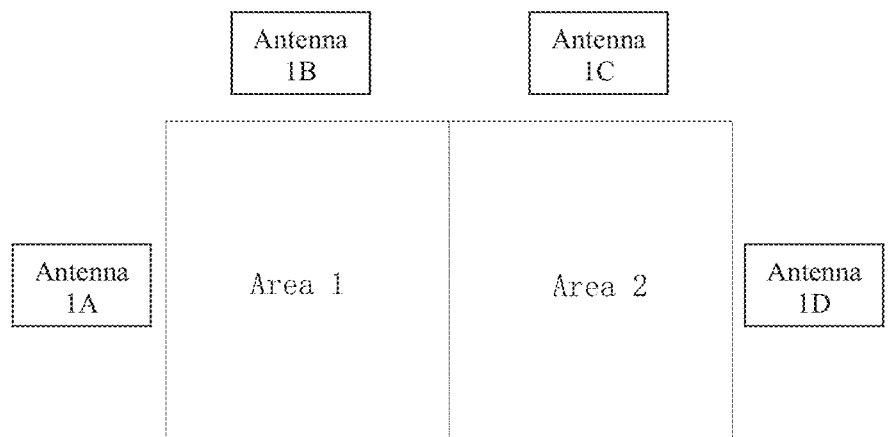
FIG. 4 is a layout drawing of the arrangement of a first kind of antenna situated at the medical refrigerator or freezer of an embodiment of the present application.
Figure 5:
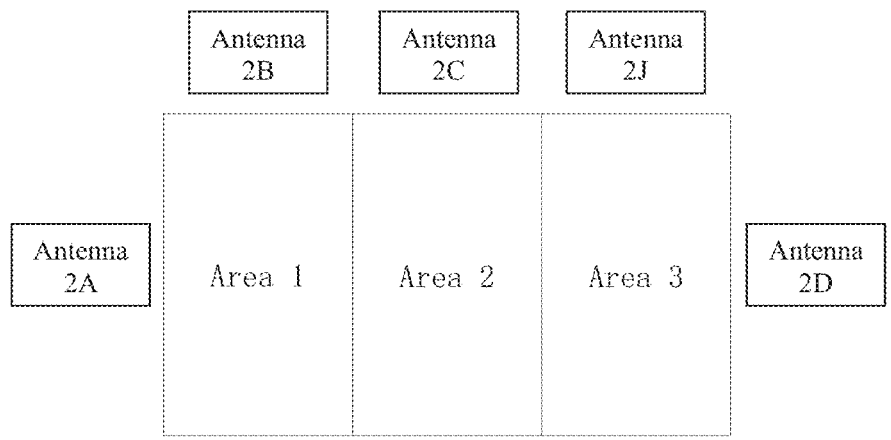
FIG. 5 is a layout drawing of the arrangement of a second kind of antenna situated at the medical refrigerator or freezer of an embodiment of the present application.
Figure 6:
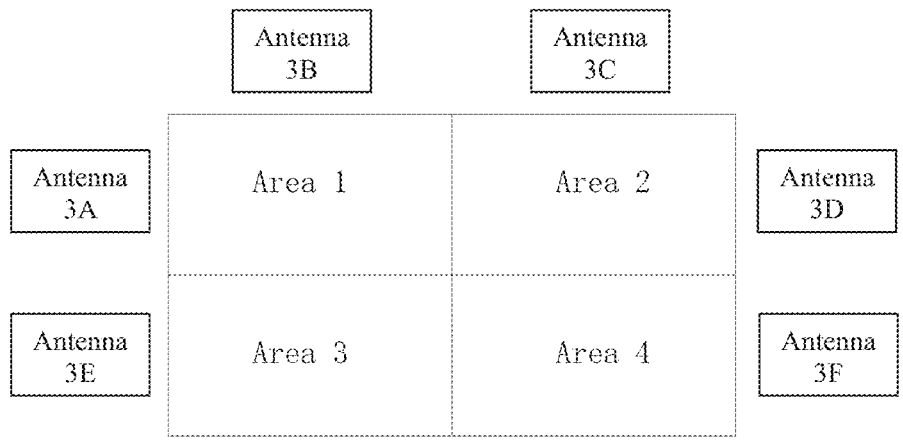
FIG. 6 is a layout drawing of the arrangement of a third kind of antenna situated at the medical refrigerator or freezer of an embodiment of the present application.
Figure 7:
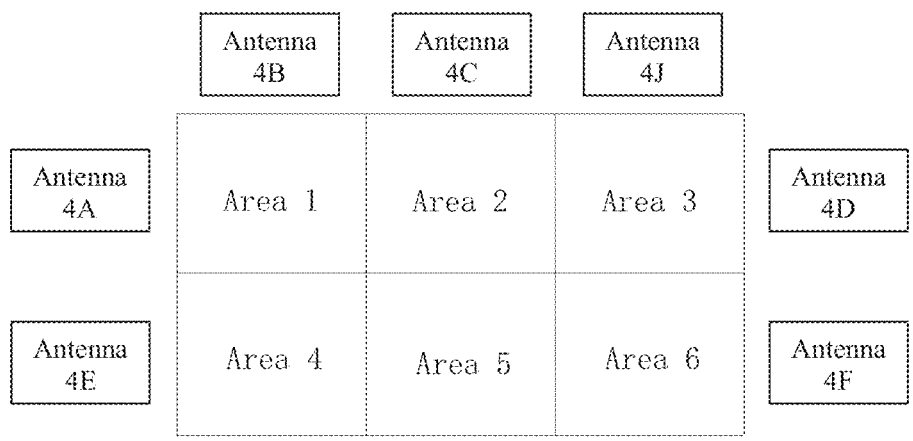
FIG. 7 is a layout drawing of the arrangement of a fourth kind of antenna situated at the medical refrigerator or freezer of an embodiment of the present application.
Figure 8:
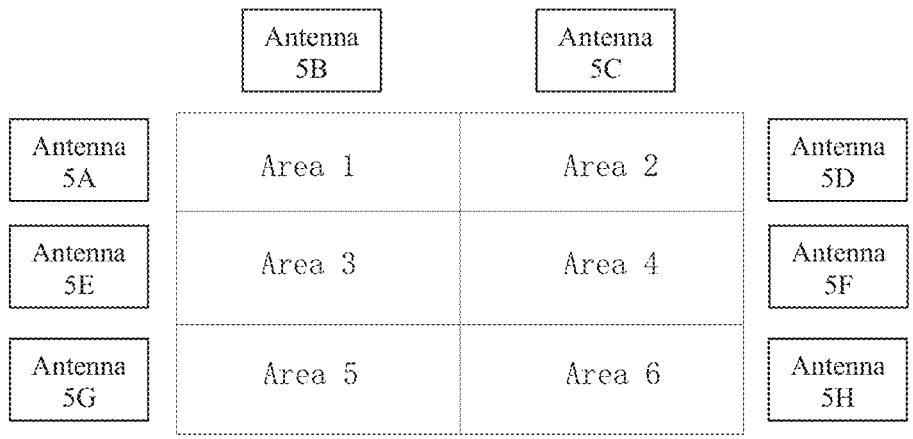
FIG. 8 is a layout drawing of the arrangement of a fifth kind of antenna situated at the medical refrigerator or freezer of an embodiment of the present application.
Figure 9:
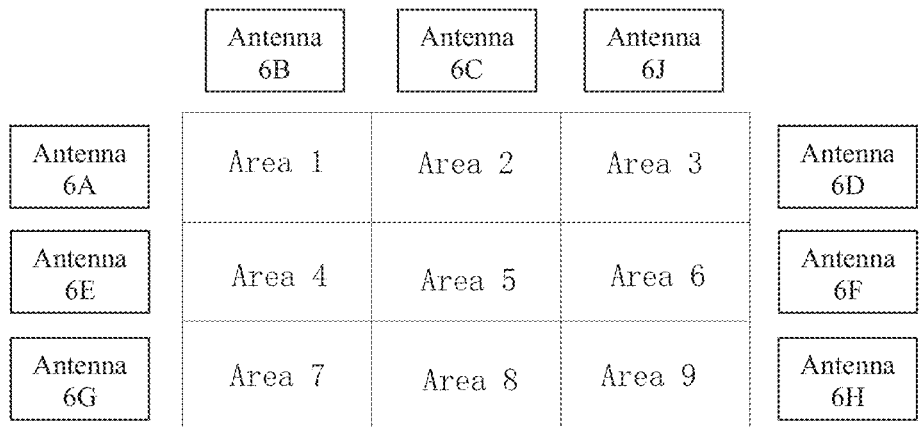
FIG. 9 is a layout drawing of the arrangement of a sixth kind of antenna situated at the medical refrigerator or freezer of an embodiment of the present application.

In one embodiment, a system of controlling and managing the medical supplies stored in the medical refrigerator or freezer includes: a reader, antennas, RF multi-plexer, remote computer and transponder or tag that is attached on the medical supplies. The storage space in the medical refrigerator or freezer is compartmentalized horizontally into several layers. The medical supplies include medications, reagents, vaccines, and these medical supplies are stored within the storage space of each layer of the medical refrigerator or freezer. Each transponder or tag on the medical supply stores the identification code of the corresponding medical supply and can also store the name, remaining amount, expiration date, and inside each transponder or tag is situated with temperature sensor. Below is an explanation of the layout of the arrangement of antennas: as FIG. 4 illustrates, a first antenna configuration arrangement includes situating antennas outside the two side walls of the storage space respectively. Specifically, the left side wall is situated with antenna 1A, the right side wall is situated with antenna 1D, the exterior of the rear wall of the storage space is situated with two antennas 1B, 1C. As FIG. 5 illustrates, a second antenna configuration arrangement includes situating antennas outside the two side walls of the storage space respectively. Specifically, the left side wall is situated with antenna 2A, the right side wall is situated with antenna 2D, the exterior of the rear wall of the storage space is situated with three antennas 2B, 2C, 2J. As shown in FIG. 6, a third antenna configuration arrangement includes situating two antennas outside the two side walls of the storage space respectively. Specifically, the left side wall is situated with antennas 3A, 3E, the right side wall is situated with antennas 3D, 3F, the exterior of the rear wall of the storage space is situated with two antennas 3B, 3C. As shown in FIG. 7, a fourth antenna configuration arrangement includes situating two antennas outside the two side walls of the storage space respectively. In specific, the left side wall is situated with antennas 4A, 4E, the right side wall is situated with two antennas 4D, 4F, the exterior of the rear wall of the storage space is situated with three antennas 4B, 4C, 4J; as shown in FIG. 8, a fifth antenna configuration arrangement includes situating three antennas outside the two side walls of the storage space respectively. In specific, the left side wall is situated with three antennas 5A, 5E, 5G, the right side wall is situated with three antennas 5D, 5F, 5H, the exterior of the rear wall of the storage space is situated with two antennas 5B, 5C; as shown in FIG. 9, a sixth antenna configuration arrangement includes situating three antennas outside the two side walls of the storage space. In specific, the left side wall is situated with three antennas 6A, 6E, 6G, the right side wall is situated with three antennas 6D, 6F, 6H, the exterior of the rear wall of the storage space is situated with three antennas 6B, 6C, 6J. In this embodiment, the function and connecting relationship of the RF multi-plexer and remote computer can refer to the previous embodiments, and thus will not be reiterated. Below is an explanation of how the system in the embodiment controls the medical supplies, which includes the following steps:

s11. The RF multi-plexer, according to the assigned task, selects and connects to the antennas situated at the corresponding layers;

s12. The reader, through the antennas of the corresponding layers, scans the transponder or tag on the medical supply stored in the storage space of the corresponding layers, and sends the read identification code, name, remaining amount, expiration date, and the detected temperature to the remote computer;

s13. The remote computer receives the read identification code, name, remaining amount, expiration date and detected temperature of the medical supplies from the reader, and determines the specific location of the medical supplies stored in the storage space according to the situated location of the antennas at the corresponding layers and their beam coverage scope, so that one can quickly retrieve the medical supplies. According to the remaining amount of the medical supplies as received to determine whether the medical supplies have been fully utilized and perform cost control. According to the expiration date as received to determine whether the expiration date has arrived, and display warning signals on the expiration date. According to the detected temperature to determine whether the frozen or cold environmental temperature has exceeded the pre-set temperature scope, and sends out warning signals when the pre-set temperature scope has been exceeded. The warning signals include mobile phone warning signals, internet warning signals, sound or text messages.

Below is an explanation in specific of the logical determination of the specific location of the medical supplies: for example, detecting the layout map of the first antenna configuration arranged at the medical refrigerator or freezer, the RF multi-plexer connects to the antennas 1A, 1B, 1C, 1D situated at the first configuration arrangement, the reader reads the transponder or tag on the medical supply within the beam coverage scope of each antenna through antennas 1A, 1B, 1C, 1D, and sends to the processing unit. The processing unit, according to the situated location of these antennas and their beam coverage scope, can determine the specific location of the medical supplies, and allows one to quickly retrieve the medical supplies. For example, if the transponder or tag of certain medical supply is read by the reader through antenna 1A or 1B or simultaneously through antennas 1A and 1B, that means that certain medical supply is stored in Area 1 of the first arrangement of the medical refrigerator or freezer. If another transponder or tag of certain medical supply is read by the reader through antennas 1C, 1D or simultaneously through antennas 1C and 1D, that means that certain medical supply is stored in Area 2 of the first arrangement of the medical refrigerator or freezer. Similarly, the logical determination of the second configuration, the third configuration, the fourth configuration, the fifth configuration, the sixth configuration and so forth can be studied from the below list.

The detecting of the location of medical supplies of other antennas configuration also applies the same method, details can be studied from the below list, wherein, "∩" indicates that the reader simultaneously reads through two antennas:

| Antenna | Antenna arrangement and its corresponding layout map | Location of the medical supplies |
|---|---|---|
| 1A | A first antenna configuration (FIG. 4) | Area 1 |
| 1B | | Area 1 |
| 1A∩1B | | Area 1 |
| 1C | | Area 2 |
| 1D | | Area 2 |
| 1C∩1D | | Area 2 |
| 2A | A second antenna configuration (FIG. 5) | Area 1 |
| 2B | | Area 1 |
| 2A∩2B | | Area 1 |
| 2J | | Area 3 |
| 2D | | Area 3 |
| 2J∩2D | | Area 3 |
| 2C | | Area 2 |
| 2C∩2A | | Area 2 |
| 2C∩2D | | Area 2 |
| ... | ... | ... |
| 6A | A sixth antenna configuration (FIG. 9) | Area 1 |
| 6B | | Area 1 |
| 6A∩6B | | Area 1 |
| 6J | | Area 3 |
| 6D | | Area 3 |
| 6J∩6D | | Area 3 |
| 6C | | Area 2 |
| 6A∩6C | | Area 2 |
| 6D∩6C | | Area 2 |
| 6E | | Area 4 |
| 6B | | Area 4 |
| 6E∩6B | | Area 4 |
| 6C | | Area 5 |
| 6E∩6C | | Area 5 |
| 6F∩6C | | Area 5 |
| 6F | | Area 6 |
| 6J | | Area 6 |
| 6F∩6J | | Area 6 |
| 6G | | Area 7 |
| 6B | | Area 7 |
| 6G∩6B | | Area 7 |
| 6C | | Area 8 |
| 6G∩6C | | Area 8 |
| 6H∩6C | | Area 8 |
| 6H | | Area 9 |
| 6J | | Area 9 |
| 6H∩6J | | Area 9 |

One emphasis should be made here is that the above only one embodiment of the present application. The configuration of antennas at medical refrigerator or freezer is not confined to the above mentioned six kinds. Further, the location and number of the antennas situated in each layer are also not confined to the layout mentioned in the embodiment above. In other embodiments, medical refrigerator or freezer may use any number of antennas configuration, and the number of antennas situated in each layer can be any numbers ranging from 4 to 9 or other numbers.

Figure 10:
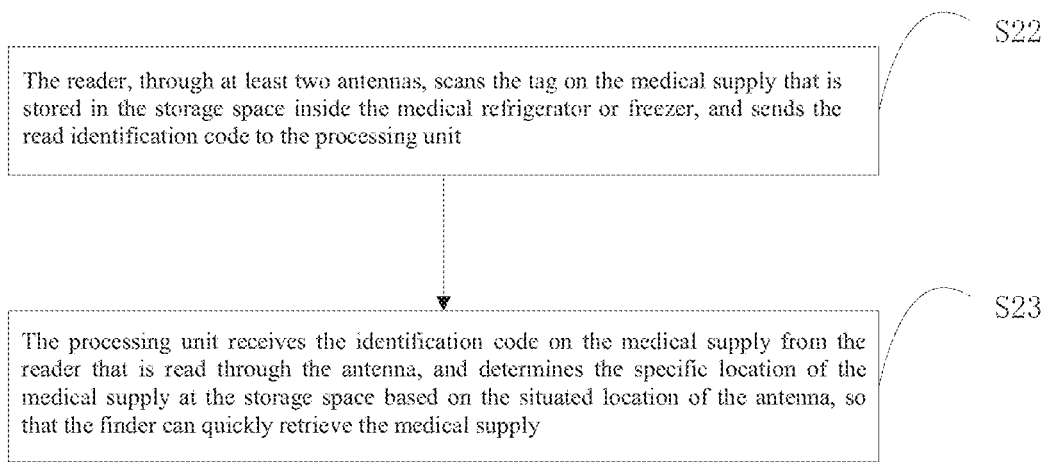
FIG. 10 is a flow chart of the method of controlling and managing the medical supplies stored in the medical refrigerator or freezer of an embodiment of the present application.

FIG. 10 is a flow chart of a method of controlling and managing the medical supplies stored in medical refrigerator or freezer according to an embodiment of the present application, in combination with FIG. 1, the method includes:

s22. The reader, through at least two antennas, scans the transponders or tags on the medical supplies stored in the medical refrigerator or freezer, and sends the read identification code to the processing unit;

s23. The processing unit receives the identification code of the medical supply read from the reader through the antennas and determines the specific location of the medical supplies in the storage space according to the situated location of the antennas and their scope of beam coverage, so that one can quickly retrieve the medical supplies.

In one embodiment, step s22 also includes: sends the read temperature as detected by the temperature sensor to the processing unit; step s23 also includes: the processing unit receives the temperature detected by the temperature sensor read from the reader through the antennas, and determines whether the frozen or cold environmental temperature has exceeded the pre-set temperature scope according to the temperature as detected, and sends out warning signals when the temperature scope has exceeded the pre-set limit. Warning signals include mobile phone warning signals, internet warning signals, sound or text messages.

In one embodiment, step s22 also includes: sends out the remaining amount of corresponding medical supplies as read to the processing unit; step s23 also includes: the processing unit receives the remaining amount of the medical supplies read by the reader through the antennas, and determines whether that medical supply has been fully utilized according to the remaining amount of that medical supply received so as to perform cost control.

In one embodiment, step s22 also includes: sends the read expiration date of the corresponding medical supply to the remote computer; step s23 also includes: the processing unit receives the expiration date of the medical supply read by the reader through the antenna, and determines whether the expiration date has arrived according to the expiration date as received, and display warning signals on the expiration date.

In one embodiment, the method also includes: the processing unit records the cut-off time of the electricity in the medical refrigerator or freezer, and sends out notice on temperature gathered during the electricity cut-off period and revive time when the electricity has been revived. For example, methods of sending out the notice may include sound, voice, short messages or wired/wireless internet mode.

Figure 11:
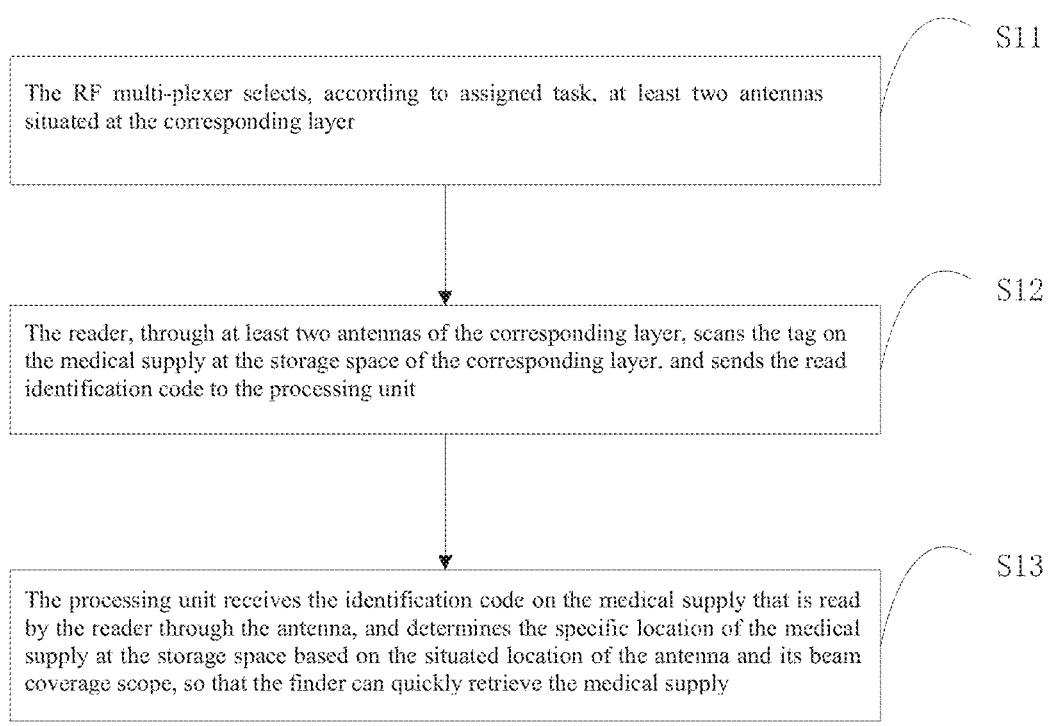
FIG. 11 is a flow chart of the method of controlling and managing the medical supplies stored in the medical refrigerator or freezer of an embodiment of the present application.

FIG. 11 is a flow chart of a method of controlling and managing the medical supplies stored in medical refrigerator or freezer according to another embodiment of the present application, in combination with FIG. 3, the method includes: s11. The RF multi-plexer, according to assigned task, selects and connects to at least two antennas situated at the corresponding layer;
s12. The reader, through at least two antennas at the corresponding layer, scans the transponder or tag of the medical supply stored in the storage space of the corresponding layers, and sends the identification code as read to the processing unit;
s13. The processing unit receives the identification code of the medical supply read from the reader through the antennas, and determines the specific location of the medical supply in the storage space according to the situated location of the antennas and their scope of beam coverage, so as to allow one to quickly retrieve that medical supply.

One emphasis should be made, in that when comparing the embodiment as illustrated in FIG. 11 to that as illustrated in FIG. 10, the only difference lies in that the embodiment as illustrated in FIG. 11 can also detect the location of the medical supply within multiple layers of the medical refrigerator or freezer through a RF multi-plexer.

In one embodiment, step s12 also includes: sends the read temperature as detected by the temperature sensor to the processing unit; step s13 also includes: the processing unit receives the temperature as detected by the temperature sensor read by the reader through the antennas, and determines whether the frozen or cold environmental temperature has exceeded the pre-set scope of temperature according to the temperature as detected, and sends out warning signals when the pre-set scope of temperature has been exceeded. Warning signals may include mobile phone warning signals, internet warning signals, sound or text messages. In one embodiment, step s12 also includes: sends the remaining amount of the corresponding medical supplies as read to the processing unit; step s13 also includes: the processing unit receives the remaining amount of the medical supplies read by the reader through the antennas, and according to the remaining amount of the medical supplies as received to determine whether the medical supplies have been fully utilized in order to perform cost control.

In one embodiment, step s12 also includes: sends the expiration date of the corresponding medical supplies as read to the processing unit; step s13 also includes: the processing unit receives the expiration date of the medical supplies read by the reader through the antennas, and determines whether the expiration date has arrived according to the expiration date as received and displays reminding signals when the expiration date has reached.

In one embodiment, the above method also includes: the processing unit records the cut-off time of the electricity inside the medical refrigerator or freezer, and sends out notice on the temperature as collected during the electricity cut-off period and the electricity revival time when the electricity revives. For example, the mode of sending out the notice can be through sound, voice message, short message or wired/wireless internet access.

The above mentioned is only a preferred embodiment of the present application, and does not limit the present patent application. For those skilled in the art, the present application can have various kinds of changes and adaptations. Under the spirits and principles of the present application, any amendments made equivalent to substituting or ameliorating the application, are to be included within the scope of protection of the present application.

The invention claimed is:

1. A system for controlling and managing medical supplies stored inside a medical refrigerator or freezer, the medical refrigerator or freezer comprising
a storage space compartmentalized into a plurality of areas, the system comprising:
a reader;
at least two antennas situated on an exterior side wall and an exterior rear wall of each of the areas of the storage space of the medical refrigerator or freezer respectively;
tags attached on the medical supplies respectively, wherein each of the medical supplies is stored inside each of the areas of the storage space in the medical refrigerator or freezer respectively, each of the tags stores an identification code of the corresponding medical supply;
a processing unit connected to the reader, wherein the processing unit receives the identification code of the medical supply read from the reader through the antennas and determines a specific location of each of the medical supplies in the areas of the storage space according to a situated location of the antennas and scope of beam coverage of the antennas.

2. The system of claim 1, wherein an interior of the tag is situated with a temperature sensor; and
the processing unit receives the temperature detected by the temperature sensor read from the reader through the antennas, and determines whether a frozen environmental temperature of the medical refrigerator or freezer has exceeded a pre-set temperature scope according to the temperature as detected, and sends out warning signals when the frozen environmental temperature has exceeded the pre-set temperature scope.

3. The system of claim 2, wherein the warning signals comprise mobile phone warning signals, internet warning signals, sound or text messages.

4. The system of claim 1, wherein the tag stores a remaining amount of the corresponding medical supply; and the processing unit receives the remaining amount of the medical supply read from the reader through the antennas, and determines whether the medical supply has been fully utilized according to the remaining amount of the medical supply as received so as to perform a cost control.

5. The system of claim 1, wherein the tag stores an expiration date of the medical supply; and the processing unit receives the expiration date of the medical supply read by the reader through the antennas, and determines whether the expiration date has arrived according to the expiration date as received, and display warning signals on the expiration date.

6. The system of claim 1, wherein the processing unit records cut-off time of electricity inside the medical refrigerator or freezer, and sends out a notice on the temperature as collected during an electricity cut-off period and electricity revival time when the electricity revives.

7. The system of claim 1, wherein the medical refrigerator or freezer is compartmentalized into Area 1 and Area 2 in one layer, a left exterior side wall of Area 1 is situated with antenna 1A, a right exterior side wall of Area 2 is situated with antenna 1D, a rear exterior wall of Area 1 is situated with antenna 1B, a rear exterior wall of Area 2 is situated with antenna 1C; the processing unit determines the specific location of each of the medical supplies according to following logic:

| Antenna | Location of the medical supplies |
|---|---|
| 1A | Area 1 |
| 1B | Area 1 |
| 1A ∩ 1B | Area 1 |
| 1C | Area 2 |
| 1D | Area 2 |
| 1C ∩ 1D | Area 2 | wherein, "∩" indicates that the reader simultaneously reads through two antennas.

8. The system of claim 1, wherein the medical supplies comprise medications, reagents, or vaccines.

9. The system of claim 1, wherein the processing unit is a remote computer.

10. The system of claim 1, wherein the medical refrigerator or freezer is compartmentalized into a plurality of layers.

11. The system of claim 1, wherein an exterior of each layer of the medical refrigerator or freezer is situated with any numbers of 4-9 antennas.

12. The system of claim 10 further comprising a RF multi-plexer, one end of the RF multi-plexer connects to the reader, while the other end according to an assigned task selects and connects to the corresponding antennas situated at the medical refrigerator or freezer.

13. A method for controlling and managing medical supplies stored inside medical refrigerator or freezer using the system of claim 1, comprising the steps of:

S22. scanning the tag on the medical supplies stored in the medical refrigerator or freezer through at least two antennas, sending the identification code to the processing unit; and S23. receiving the identification code of the medical supply read from the reader through the antennas and determining the specific location of the medical supplies in the storage space according to the situated location of the antennas and the scope of beam coverage of the antennas by the processing unit.

14. The method of claim 13, wherein step S22 further comprising:

sending the read temperature detected by the temperature sensor to the processing unit; and step S23 further comprising:

receiving the temperature as detected by the temperature sensor read by the reader through the antennas; determining whether the frozen environmental temperature has exceeded the pre-set temperature scope according to the temperature as detected; and sending out warning signals when the temperature scope has exceeded the pre-set limit by the processing unit.

15. The method of claim 14, wherein the warning signals comprise mobile phone warning signals, internet warning signals, sound or text messages.

16. The method of claim 13, wherein step S22 further comprising:

sending the read remaining amount of the corresponding medical supply to the processing unit; and step S23 further comprising:

receiving the remaining amount of the medical supply read from the reader through the antennas and determining whether the medical supplies are fully utilized according to the remaining amount of medical supply as received so as to perform a cost control by the processing unit.

17. The method of claim 13, wherein step S22 further comprising:

sending the expiration date of the corresponding medical supply to the processing computer; and step S23 further comprising:

receiving the remaining amount of the medical supply read by the reader through the antennas; determining whether the expiration date has arrived according to the expiration date as received; and displaying warning signals on the expiration date by the processing unit.

18. The method of claim 13 further comprising:

recording the cut-off time of the electricity inside the medical refrigerator or freezer;

and sending out the notice on the temperature as collected during the electricity cut-off period and the electricity revival time when the electricity revives by the processing unit.

19. The method of claim 13, wherein the notice is sent out through a sound, a voice message, a short message or wired/wireless interne access.

20. The method of claim 13, wherein the medical refrigerator or freezer is compartmentalized into Area 1 and Area 2 in one layer, a left exterior side wall of Area 1 is situated with antenna 1A, a right exterior side wall of Area 2 is situated with antenna 1D, a rear exterior wall of Area 1 is situated with antenna 1B, a rear exterior wall of Area 2 is situated with antenna 1C;

the method further comprises determining the specific location of each of the medical supplies according to following logic:

| Antenna | Location of the medical supplies |
|---------|----------------------------------|
| 1A | Area 1 |
| 1B | Area 1 |
| 1A ∩ 1B | Area 1 |
| 1C | Area 2 |
| 1D | Area 2 |
| 1C ∩ 1D | Area 2 | wherein, "∩" indicates that the reader simultaneously reads through two antennas.

* * * * *